UNITED STATES PATENT OFFICE.

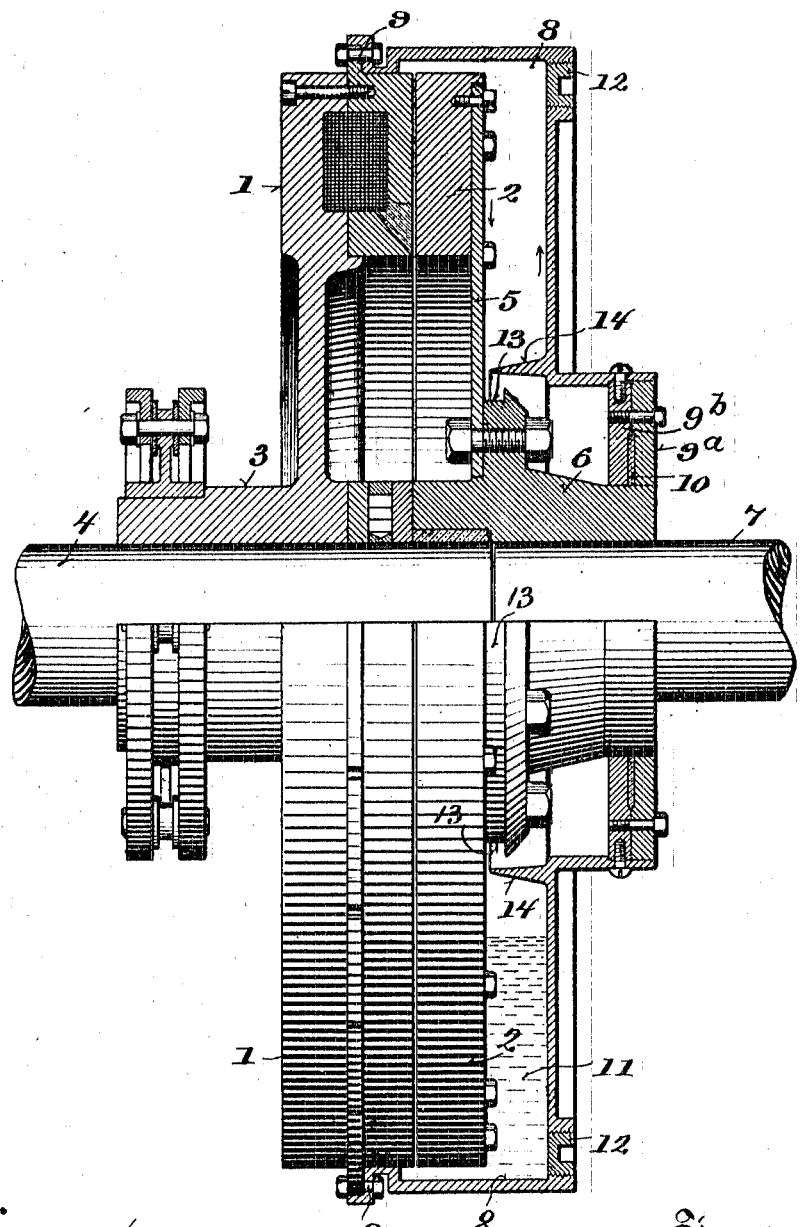

LEWIS D. ROWELL, OF MILWAUKEE, WISCONSIN, ASSIGNOR TO CUTLER-HAMMER CLUTCH COMPANY, OF MILWAUKEE, WISCONSIN, A CORPORATION OF WISCONSIN.

LUBRICATED CLUTCH AND SIMILAR DEVICE.

1,059,395.  Specification of Letters Patent.  Patented Apr. 22, 1913.

Application filed December 15, 1905. Serial No. 291,949.

*To all whom it may concern:*

Be it known that I, LEWIS D. ROWELL, a citizen of the United States, residing at Milwaukee, in the county of Milwaukee and State of Wisconsin, have invented new and useful Improvements in Lubricated Clutches and Similar Devices, of which the following is a full, clear, concise, and exact description, reference being had to the accompanying drawing, forming a part of this specification.

My invention relates particularly to clutches wherein a casing or receptacle is provided which contains an oil bath for lubricating the faces of the clutch members.

It has been found that where the casing is carried by one of the members and incloses the other member, it being rotated with the former member, the oil tends to leak through the joint between said casing and the latter member.

It is the object of my invention to provide means for preventing the oil from leaking in this way.

Although my invention is especially applicable to clutches, it will be understood that it may be used in various relations, and, furthermore, that it may be applied to clutches of any form.

In order to explain my invention I shall show and describe particularly a magnetic clutch which has been developed in practice to embody the same.

The accompanying drawing contains a partial sectional view of the clutch.

I shall merely describe such features of the clutch as shall be necessary to set forth my invention.

The clutch may be provided with a magnet member 1 and an armature member 2. These members may have the same general construction as that illustrated in the patent of August 4th, 1905, No. 786,411. The magnet member 1 may be mounted upon a hub 3 which is preferably fixed upon a driving shaft 4. The armature member may be mounted upon a spring disk 5 which will yield sufficiently to permit the same to move into contact with the magnet member 1. The disk 5 may be mounted upon a hub 6 which is preferably fixed upon a driven shaft 7.

The driving shaft 4, the hub 3 and the magnet member 1, preferably constitute the driving member of the clutch, and the driven shaft 7, the hub 6, the disk 5, and the armature member 2, preferably constitute the driven member thereof. The driving shaft and the driven shaft are preferably arranged in alinement in a horizontal position, the same being journaled in suitable bearings. The driving shaft 4 may be connected in any suitable way to a source of power or prime mover, and the driven shaft 7 may be connected in any suitable way to the machinery or load to which power is to be transmitted.

In order to connect the members of the clutch so as to transmit power from the prime mover to the load, the magnet member may be magnetized by energizing its winding to attract the armature member thereto.

The casing 8 which may be carried by the magnet member, is preferably fastened thereto by means of bolts 9. The casing extends over the armature member 2, and is preferably provided with annular plates 9$^a$, 9$^b$, into which extends the hub 6, and between which may be clamped a packing 10, thereby forming a dust proof joint. The casing serves to contain an oil bath 11 and also to exclude dust and dirt. The oil bath provides a film of oil between the magnet member and the armature member. When the magnet member is magnetized to attract the armature member thereto, the oil film serves to lubricate the faces of these members while relative movement takes place between the same, and it also prevents the armature member from being brought into immediate mechanical contact with the magnet member, thereby preventing the driving member from starting the driven member too suddenly. These results are especially advantageous where the clutch operates upon the same principles as the clutch which is set forth in the aforesaid patent.

The casing 8 is preferably provided with apertures through which the oil or lubricant may be inserted and removed, and said apertures are preferably provided with plugs 12 which are threaded into the same.

The hub 6 is preferably provided with an annular trough or channel 13 which is arranged adjacent to the disk 5 and concentric with the axis of the clutch, one side thereof preferably being formed by the disk 5 and the other by a flange having an inclined peripheral face as shown.

The casing 8 is preferably provided with an annular flange or rib 14 which is arranged concentric with the trough 13 and projects over the same.

In order to set forth the purpose of the trough 13 and the flange 14, I shall describe the results which the same produce while the clutch is in certain stages of operation. The driving member rotates continuously, but the driven member may rotate with the same or stand at rest. Inasmuch as the casing 8 rotates with the driving member, the oil 11 will be carried toward the periphery thereof by centrifugal force. In consequence, the oil at the top of the casing cannot run down the inside thereof to the joint between the casing and the hub 6. While the driven member is at rest the oil which accumulates at the top thereof will run down the upper part to the trough 13. It will then flow around the trough to the lower part of the same, and thence pass on down the rear side of the lower part of the disk to the bottom of the casing. The trough thus serves to keep the oil from running over the upper portion of the hub 6 to the joint between said ring and said hub, and then leaking through the same. The flange 14 restricts in volume the flowing oil which runs into the trough 13, since the passage between the flange and the disk 5 is quite narrow. In consequence, the oil cannot run into the trough so rapidly as to flow over the flange at the side thereof and thence pass onto the hub 6. When the driven member is rotating, the oil on the inclined peripheral face of the flange at the side of the trough 13 is carried inwardly and then thrown toward the disk 5 by centrifugal force.

It will, of course, be understood that my invention is applicable to many purposes and that the same may assume various forms.

Having thus described my invention what I claim and desire to secure by Letters Patent is:

1. In combination, a hollow member adapted to contain a lubricating bath, a member within said hollow member, said members having a joint permitting relative rotation thereof, one of said members having a trough or channel for receiving down-flowing lubricant to convey the same away from the joint and means carried by the other member restricting the volume of lubricant entering the trough or channel but permitting a discharge of the lubricant from the trough or channel into the lower portion of said hollow member, and insuring against the lubricant so discharged reaching the joint.

2. In combination, a hollow member adapted to contain a lubricating bath, a member within said hollow member, said members having a joint permitting relative rotation thereof and one of said members having a trough or channel for receiving down-flowing lubricant to convey the same away from the joint and into the lower portion of said hollow member and a flange carried by the other member for restricting the volume of lubricant entering said trough or channel, said flange permitting a discharge of the lubricant from the trough or channel into said hollow member, and directing any lubricant discharged thereon away from the joint.

3. In combination, a hollow member arranged to contain an oil bath, a member within said hollow member, said members having a joint permitting relative rotation thereof and one of said members being provided with a trough or channel for receiving down-flowing lubricant and conveying the same away from the joint into the lower part of said hollow member and an annular flange carried by the other member and surrounding the trough or channel to restrict the volume of lubricant entering the same, said flange having its inner face inclined to convey any lubricant discharged from the trough or channel thereon away from the joint into said hollow member.

4. In combination, a hollow member arranged to contain an oil bath, a member within said hollow member, said members having a joint permitting relative rotation thereof and one of said members having a trough or channel for receiving lubricant flowing down the same and means on the other member tending to convey the oil flowing down said latter member into the trough or channel and restricting the volume of lubricant entering the same but permitting a discharge of all lubricant from the trough or channel into the hollow member.

5. In combination, a hollow member, a member within the same, said members having a joint between the same permitting relative rotation thereof and one of said members having a trough or channel and an annular flange on the other member surrounding the trough or channel and restricting the volume of lubricant entering the same, the outer face of said flange being inclined toward the trough or channel and the inner face thereof being inclined away from the joint, to convey all lubricant discharged thereon away from the joint.

6. In combination, a hollow member arranged to contain an oil bath, a member within said hollow member, said members being journaled upon a horizontal axis and having a joint between the same for permitting relative movement thereof, an annular trough or channel provided on one of said members to receive lubricant flowing down the same and convey it away from said joint, an annular flange on the adjacent vertical face of the other of said members arranged to convey the lubricant flowing down said latter member into said trough or channel, said flange being arranged to surround said trough or channel to restrict the volume of lubricant entering the same to prevent an over-flow thereof.

7. In combination, a hollow member arranged to contain an oil bath, a member within said hollow member, said members being journaled upon a horizontal axis and having a joint between the same for permitting relative movement thereof, an annular trough or channel provided on one of said members to receive lubricant flowing down the same and convey it away from said joint, an annular flange on the other of said members arranged to convey the lubricant flowing down the same into said trough or channel, said flange being arranged to surround said trough or channel to restrict the volume of lubricant entering the same and having its inner face inclined to convey any lubricant discharged thereon away from said joint.

8. In a clutch, in combination, two concentric clutch members, a casing fixed to one of said members and inclosing the other member, a joint between said casing and said latter member permitting relative rotation thereof, said casing and said latter member having overlapping annular flanges inclosing said joint, the inner flange being provided with a trough or channel arranged to receive all lubricant flowing between said flanges and to convey the same to the lower portion of said casing and the outer flange restricting the volume of lubricant entering the trough or channel and directing any lubricant discharged thereon from the trough or channel away from said joint.

9. In combination, a driving member adapted to rotate continuously, a driven member adapted to stand at rest, a casing carried by said driving member and having a joint formed between the same and said driven member, said casing being adapted to contain an oil bath, an annular trough or channel carried by said driven member and adapted to catch the oil running down the same to prevent said oil from reaching said joint, and means for restricting the volume of oil flowing in said channel.

10. In combination, a driving member adapted to rotate continuously, a driven member adapted to stand at rest, a casing carried by said driving member and having a joint formed between the same and said driven member, said casing being adapted to contain an oil bath, an annular trough or channel carried by said driven member and adapted to catch the oil running down the same to prevent said oil from reaching said joint, and an annular flange carried by said casing and projecting over said trough, said flange being adapted to restrict the amount of oil that may flow into said trough.

11. In combination, a driving member adapted to rotate continuously, a driven member adapted to stand at rest, said driving member and said driven member being carried by horizontal alining shafts, a casing carried by said driving member and surrounding said driven member, said casing being adapted to contain an oil bath and having a joint formed between the same and said driven member, an annular channel or trough carried by said driven member and adapted to catch the oil flowing down said driven member to conduct it to the lower part of said driven member so as to prevent it from reaching said joint, and means for restricting the amount of oil that may flow into said trough or channel.

12. In combination, a driving shaft, a driven member mounted thereon and adapted to rotate continuously, a driven shaft, a hub mounted upon said driven shaft, a driven member carried by said hub, a casing carried by said driving member and surrounding said driven member, said casing being adapted to contain an oil bath and having a joint formed between the same and said driven member, an annular trough or channel carried by said hub and adapted to catch the oil running down said driven member from the upper portion thereof to conduct it to the lower portion of said driven member so as to prevent it from running over the top of said hub to said joint, and means for restricting the amount of oil that may flow into said trough.

13. In combination, a driving shaft, a driven member mounted thereon and adapted to rotate continuously, a driven shaft, a hub mounted upon said driven shaft, a driven member carried by said hub, a casing carried by said driving member and surrounding said driven member, said casing being adapted to contain an oil bath and having a joint formed between the same and the driven member, an annular channel or trough carried by said hub and adapted to catch the oil running down said driven member from the upper portion thereof to conduct it to the lower portion of said driven member so as to prevent it from running over the top of said hub to said joint, and a flange extending over said trough and adapted to restrict the amount of oil that may flow into the same.

14. In a magnetic clutch, in combination, a driving member, a driven member, each member having a face adapted to engage the face of the other member, said members being journaled in axial alinement, a casing carried by the driving member and extending over the periphery and the back of said driven member, said casing and said driven member being provided with a suitable bearing joint between the same where the driven member passes through said casing, said casing being adapted to contain an oil bath, an annular trough arranged upon the back of said driven member inside of said casing, and adapted to catch the oil flowing down the upper portion of the back of said driven member and convey it to the bottom portion of the back of said driven member so as not to allow said oil to reach said joint.

15. In a magnetic clutch, in combination, a driving member, a driven member, each member having a face adapted to engage the face of the other member, said members being journaled in axial alinement, a casing carried by the driving member and extending over the periphery and the back of said driven member, said casing and said driven member being provided with a suitable bearing joint between the same where the driven member passes through said casing, said casing being adapted to contain an oil bath, an annular trough arranged upon the back of said driven member concentrically with the axis thereof, and an annular flange formed upon said casing and extending over said trough to a point near the back of said driven member to restrict the amount of oil that may flow into said trough.

16. In a magnetic clutch, in combination, a driving member, a driven member, each member having a face adapted to engage the face of the other member, said members being journaled in axial alinement, a casing carried by the driving member and extending over the periphery and the back of said driven member, said casing and said driven member being provided with a suitable bearing joint between the same where the driven member passes through said casing, said casing being adapted to contain an oil bath, an annular trough arranged upon the back of said driven member concentric with the axis thereof, and having one wall formed by a flange, the periphery of which is inclined, and a flange formed upon said casing and extending over said trough to a point near the back of said driven member.

In witness whereof, I have hereunto subscribed my name in the presence of two witnesses.

LEWIS D. ROWELL.

Witnesses:
WALTER E. SARGENT,
J. F. HAWKINS.